United States Patent [19]

Tomisawa

[11] Patent Number: 4,901,318
[45] Date of Patent: Feb. 13, 1990

[54] ADDRESS GENERATING CIRCUIT

[75] Inventor: Shin'ichiro Tomisawa, Takatsuki, Japan

[73] Assignee: Sanyo Electric Co., Ltd., Osaka, Japan

[21] Appl. No.: 184,335

[22] Filed: Apr. 21, 1988

[30] Foreign Application Priority Data

Apr. 28, 1987 [JP] Japan .................................. 62-105390

[51] Int. Cl.$^4$ ............................................. G06F 11/10
[52] U.S. Cl. ...................................... 371/40.1; 371/37.8
[58] Field of Search ........................ 371/37, 38, 39, 40; 369/59; 360/72.1, 33, 57, 59

[56] References Cited

U.S. PATENT DOCUMENTS

| | | | |
|---|---|---|---|
| 4,672,614 | 6/1987 | Yoshida | 371/38 |
| 4,710,934 | 12/1987 | Traynor | 371/38 |
| 4,715,036 | 12/1987 | Oakos | 371/37 |
| 4,775,978 | 10/1988 | Hartness | 371/38 |
| 4,788,685 | 11/1988 | Sako | 371/38 |

Primary Examiner—Michael R. Fleming
Attorney, Agent, or Firm—Stanger, Michaelson, Reynolds, Spivak & Tobia

[57] ABSTRACT

An address generating circuit (13) generates a reading address for reading a buffer memory (16) so that so-called P and Q codes for a CD-ROM which have parameters i and j can be decoded. The reading address is obtainable based on a formula $RDA = H + 2L + p$, where H is a starting address of one block not inluding synchronous signal or pattern, L is a symbolic location of a symbol, and p is a sign for designating that the symbol is included in a LSB byte plane or an MSB byte plane. A first full adder (25) generates the symbolic location L based on the parameter i and j with various constants being given from a constant generator (23) so as to give the symbolic location L to a second full adder (21). The starting address H is given from a writing address pointer (12a). The second full adder adds H, 2L and p to apply the reading address to an address bus. In addition, the symbolic location L is latched in a symbol off-set address (26) and, if necessary, fed-back to the first full adder through multiplexers (24, 27) when the next symbolic location is to be generated.

4 Claims, 12 Drawing Sheets $P(i, 0, p)$    $L = i$ $P(i, j, p)$    $j \neq 0$    $L_j = L_{j-1} + 43 = i + 43j$ $Q(0,0,p)$   $L=0$ $Q(i,0,p)$   $i \neq 0$   $L_{i,0} = L_{i-1,0} + 43 = 43i$ $Q(i,j,p)$   $j = 1, 2, \cdots, 42$   $L_{i,j} = L_{i,j-1} + 44 (<1118)$ $Q(i,j,p)$   $j = 1, 2, \cdots, 42$   $L_{i,j} = L_{i,j-1} - 1074$ $Q(i, 43, p)$  $L_{i,43} = i + 1118$ $Q(i, 44, p)$  $L_{i,44} = i + 1144$

F I G.14

| | 0 | 1 | 2 | 3 | 4 | --- | --- | --- | --- | 40 | 41 | 42 | |
|---|---|---|---|---|---|---|---|---|---|---|---|---|---|
| 0 | 0000 | 0001 | 0002 | 0003 | 0004 | --- | --- | --- | --- | 0040 | 0041 | 0042 | |
| 1 | 0043 | 0044 | 0045 | 0046 | 0047 | --- | --- | --- | --- | 0083 | 0084 | 0085 | |
| 2 | 0086 | 0087 | 0088 | 0089 | 0090 | --- | --- | --- | --- | 0126 | 0127 | 0128 | |
| 3 | 0129 | 0130 | 0131 | 0132 | 0133 | --- | --- | --- | --- | 0169 | 0170 | 0171 | |
| 4 | 0172 | 0173 | 0174 | 0175 | 0176 | --- | --- | --- | --- | 0212 | 0213 | 0214 | HEADER USER DATA EDC AND SPACE (0) |
| 5 | | | | | | | | | | | | | |
| 6 | | | | | Q SEQUENCE | | | | | | | | |
| 7 | | | | | | | | | | | | | |
| 8 | P SEQUENCE | | | | | | | | | | | | |
| ⋮ | | | | | | | | | | | | | |
| 22 | 0946 | 0947 | 0948 | 0949 | 0950 | --- | --- | --- | --- | 0986 | 0987 | 0988 | |
| 23 | 0989 | 0990 | 0991 | 0992 | 0993 | --- | --- | --- | --- | 1029 | 1030 | 1031 | |
| 24 | 1032 | 1033 | 1034 | 1035 | 1036 | --- | --- | --- | --- | 1072 | 1073 | 1074 | P PARITY |
| 25 | 1075 | 1076 | 1077 | 1078 | 1079 | --- | --- | --- | --- | 1115 | 1116 | 1117 | |
| 26 | 1118 | 1119 | 1120 | 1121 | 1122 | --- | --- | 1143 | | | | | Q PARITY |
| 27 | 1144 | 1145 | 1146 | 1147 | 1148 | --- | --- | 1169 | | | | | |

|    | 0    | 1    | 2    | .   | .   | 40   | 41   | 42   | 43   | 44   |
|----|------|------|------|-----|-----|------|------|------|------|------|
| 0  | 0000 | 0044 | 0088 | ---- | ---- | ---- | 0686 | 0730 | 1118 | 1144 |
| 1  | 0043 | 0087 | 0131 | ---- | ---- | ---- | 0729 | 0773 | 1119 | 1145 |
| 2  | 0086 | 0130 | 0174 | ---- | ---- | ---- | 0772 | 0816 | 1120 | 1146 |
| .  | ---- | ---- | ---- |     |     | ---- | ---- | ---- | ---- | ---- |
| 9  | 0387 | 0438 | 0448 |     |     | ---- | 1073 | 1117 | 1127 | 1153 |
| .  | ---- | ---- | ---- |     |     | ---- | ---- | ---- | ---- | ---- |
| 23 | 0989 | 1033 | 1077 | ---- | ---- | ---- | 0557 | 0601 | 1141 | 1167 |
| 24 | 1032 | 1076 | 0002 | ---- | ---- | ---- | 0600 | 0644 | 1142 | 1163 |
| 25 | 1075 | 0001 | 0045 | ---- | ---- | 0599 | 0643 | 0637 | 1143 | 1169 |

ADDRESS GENERATING CIRCUIT

BACKGROUND OF THE INVENTION

1. Field of the invention

The present invention relates to an address generating circuit for generating an address to detect or correct data errors.

2. Description of the prior art

In, for example, a CD-ROM system or CD-I system, parity symbols (redundant data) named P parity and Q parity are added to digital data to correct data errors. By constructing error correcting codes composed of distributed data, it is possible to distribute errors which tend to be uneven so as to effectively give play an ability for error correction. Decoding P and Q codes composed of such data and parity symbols requires generating addresses in a complex manner.

One approach for such an address generation is to generate the address as software by utilizing a microcomputer. However, this creates a problem where the processing speed of the microcomputer is slow.

In addition, a table look-up system is known, in which the address necessary for decoding the code which is stored in advance in the memory is stored in a ROM and the address for decoding is obtained by utilizing the ROM. Such a table look-up system has a simple structure and a high processing speed. However, since it requires use of a ROM, it is for example difficult to build in an LSI as a decoding circuit of the CD-ROM system. Furthermore, where the error correcting code is formed by adding a P parity of 86 bytes and a Q parity of 52 bytes to the data of 1032 bytes as shown in pages 73-80 of "Electronics" Dec., 1985, the address of the output data from the ROM for generating the address for decoding the P code and the address of the output data from the ROM for generating the address for decoding the Q code become 11 bits, respectively. This makes it necessary to use at least two ROMs having a standard specification (see FIG. 17).

SUMMARY OF THE INVENTION

Therefore, a principal object of the present invention is to provide a novel address generating circuit.

Another object of the present invention is to provide an address generating circuit is the form of hardware.

Another object of the present invention is to provide an address generating circuit which does not use ROMs so that the circuitry scale can be miniaturized and the circuit produced as an LSI.

Another object of the present invention is to provide an address generating circuit having a high processing speed.

Yet another object of the present invention to provide an address generating circuit for generating an address for decoding an error correcting code, in which the circuitry scale is miniaturized, ROMs are not used so as to allow construction in the LSI, and an address is not generated in the form of software and a microcomputer is utilized to increase the error correction speed.

An address generating circuit in accordance with the present invention is constructed as a logic circuit which operates in accordance with an arrangement of respective code words, and the address generating circuit generates an address with respect to a memory in which the data and the parity symbols being added to the data are sequentially stored to decode the error correcting code which is composed of the data and the parity symbols.

As described in the following section of the preferred embodiment, an address for decoding an error correcting code can be generated by the logic circuit in accordance with present invention.

In general, it takes substantial time to calculate the address in the system in which the address is calculated by the microcomputer using software. By contrast, in accordance with the present invention, it is possible to calculate the address by means of a hardware, and therefore the processing speed becomes very high. Accordingly, in accordance with the present invention, a real-time correction can be made in an error correcting code decoder of the CD-ROM or CD-I player. Such a real-time correction is a function capable of furnishing data which has been processed for error correction from the error correction decoder at the same transfer rate as the data is transferred from the CD signal processing portion (FIG. 12). More specifically, a system in which a microcomputer calculates the address has a processing speed which is not fast, and unavoidably slow the data transfer once the error correction is started. In addition, software controlled error correction by a microcomputer makes it necessary to write new software if the kind of the microcomputer is changed and the software is developed by assembler or machine language. This means that it is necessary to develop the software for each kind of the microcomputer. By contrast, an address generation implemented by the hardware in accordance with the present invention can eliminate the above described disadvantage.

Furthermore, where the address generation is implemented by a table look-up system utilizing a ROM, it is necessary to use a ROM having an 11-bit input and 11-bit capacity output. If a ROM having such a capacity is constructed as a general-purpose ROM, at least two ROMs are required in such a circuitry. In addition, in the case where blocks are continuously written into a buffer RAM as shown in FIG. 13, a full adder etc. are required other than the ROM. This unduly enlarges the amount of hardware in such a system. Therefore, even if the circuitry including the ROM and the full adder etc. can be made as an IC, the area of such a chip becomes relatively large. Furthermore, the processing speed of the ROM is generally slow in comparison with a logical circuit in accordance with the present invention. For these reasons, the present invention is more effective than the prior art even if the circuitry is constructed as an IC.

Therefore, in accordance with the present invention, the processing speed becomes faster than that of the prior art system, and the circuitry scale becomes small so that it is easy to construct as an IC. In addition, the present invention is effective especially where the error correction should be processed in real time.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIGS. 1-16 are illustrative views showing one embodiment of the present invention, wherein FIG. 1 is a view showing an address generating circuit; FIGS. 2 and 3 are views showing a circuit portion concerning with address generation for a P code; FIGS. 4-9 are views showing a circuit portion concerning with address generation for a Q code; FIG. 10 is a timing chart of address generation for the P code; FIG. 11 is a timing chart of address generation for the Q code; FIG. 12 is a block diagram schematically showing a CD-ROM system to which the present invention is applicable; FIG. 13 is a view showing a buffer RAM; FIGS. 14 and 15 are views showing an arrangement of code words; and FIG. 16 is a view showing a decoding process for the code words.

FIG. 17 is an illustrative view showing a conventional address generation system utilizing a ROM.

DETAILED DESCRIPTION OF THE PREFERRED EMBODIMENT

Figure 12:
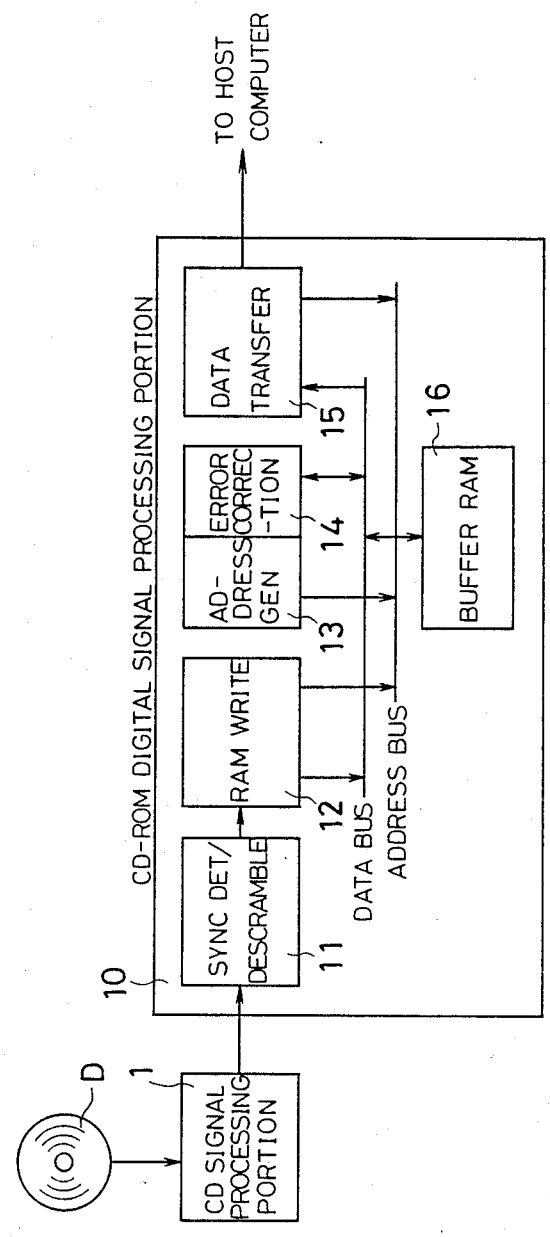

FIG. 12 is a block diagram schematically showing a CD-ROM reproduction system. A signal reproduced from a CD-ROM disk D is, first, subjected to a signal process in a CD signal processing portion 1 based on a format of a compact disk. Thereafter, the signal is transferred to a signal processing portion 10 in which the signal processing occurs based on a format of a CD-ROM. The signal processing portion 10 includes a synchronous signal detecting/descrambling circuit 11, a RAM writing circuit 12, an address generating circuit 13 for generating an address for error correction code, an error correction data processing circuit 14, a data transferring portion 15 for transferring the data to a host computer, and a buffer RAM 16. The synchronous signal detecting/descrambling circuit 11 detects the synchronous signal for each assembly of the data based on the format of the CD-ROM, which is named a block or sector, and restores (descrambles) the bit scramble created during recording. The data including the P and Q parity symbols is sequentially written into the buffer RAM 16 by the writing circuit 12. Thereafter, the data is read from such buffer RAM 16 in the order that the P code and the Q code can be decoded in accordance with the address generation circuit 13, and the error correction data processing circuit 14 performs error correction. After such a process, the data is transferred via the transferring portion 15 to the host computer in which the process is made in accordance with the data.

Figure 1:
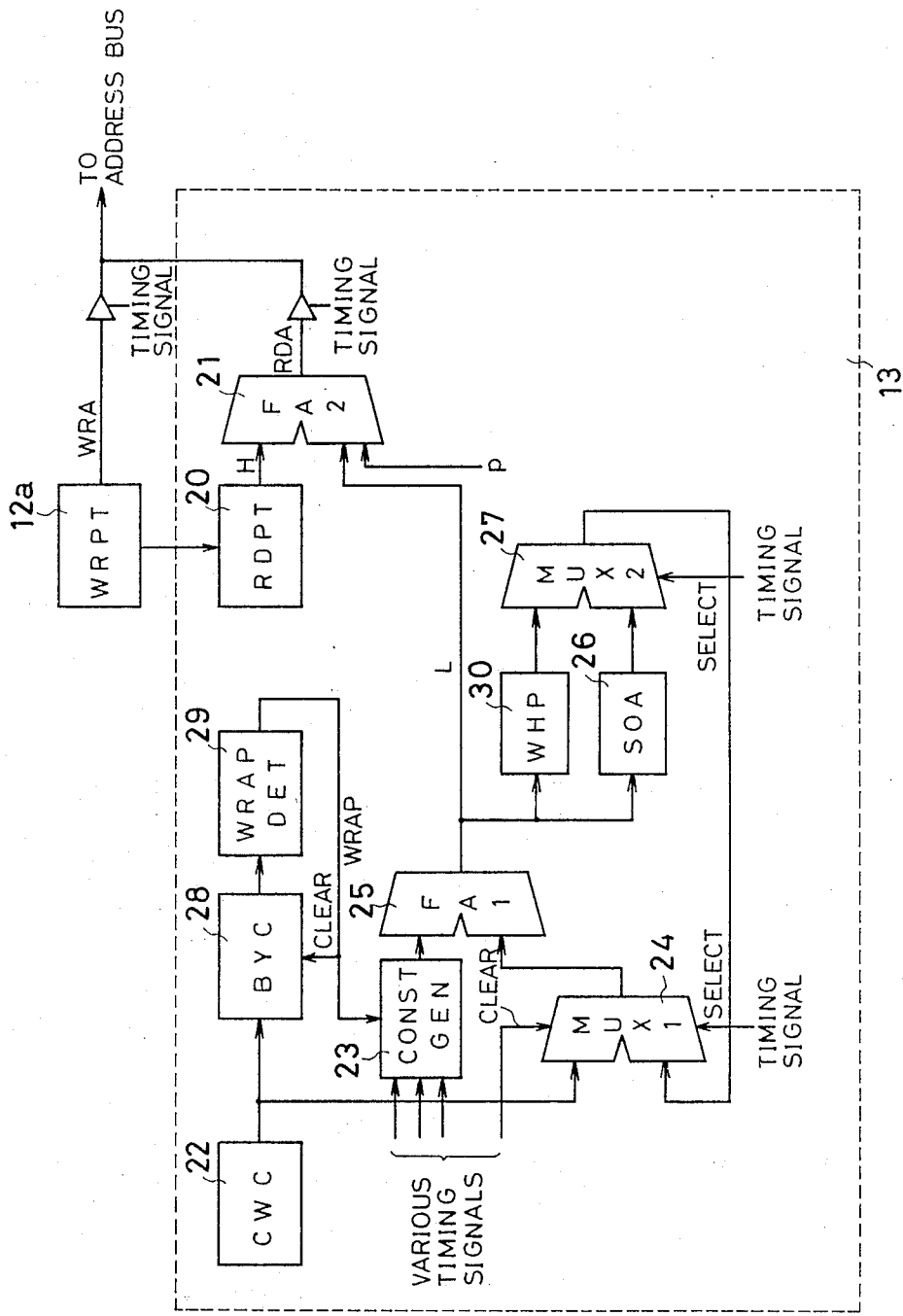

The point of the present invention exists in the above described address generation circuit 13 a configuration of which is shown in FIG. 1.

In order to aid to understand the present invention, first, a brief description follows concerning the data format of the CD-ROM. A configuration of one block (2352 bytes) in the CD-ROM system is comprised of a synchronous signal of 12 bytes, a header of 4 bytes, a user data of 2048 bytes, an error detecting symbols (EDC) of 4 bytes which is added to the synchronous signal, the header and the user data, respectively, a space of 8 bytes, P parity symbols (ECC) of 172 bytes, and Q parity symbols (ECC) of 104 bytes. The P parity symbols and the Q parity symbols are added to a total of 2064 bytes including the user data (2408bytes), the error detecting symbols (4 bytes) and the space (8 bytes).

Figure 13:
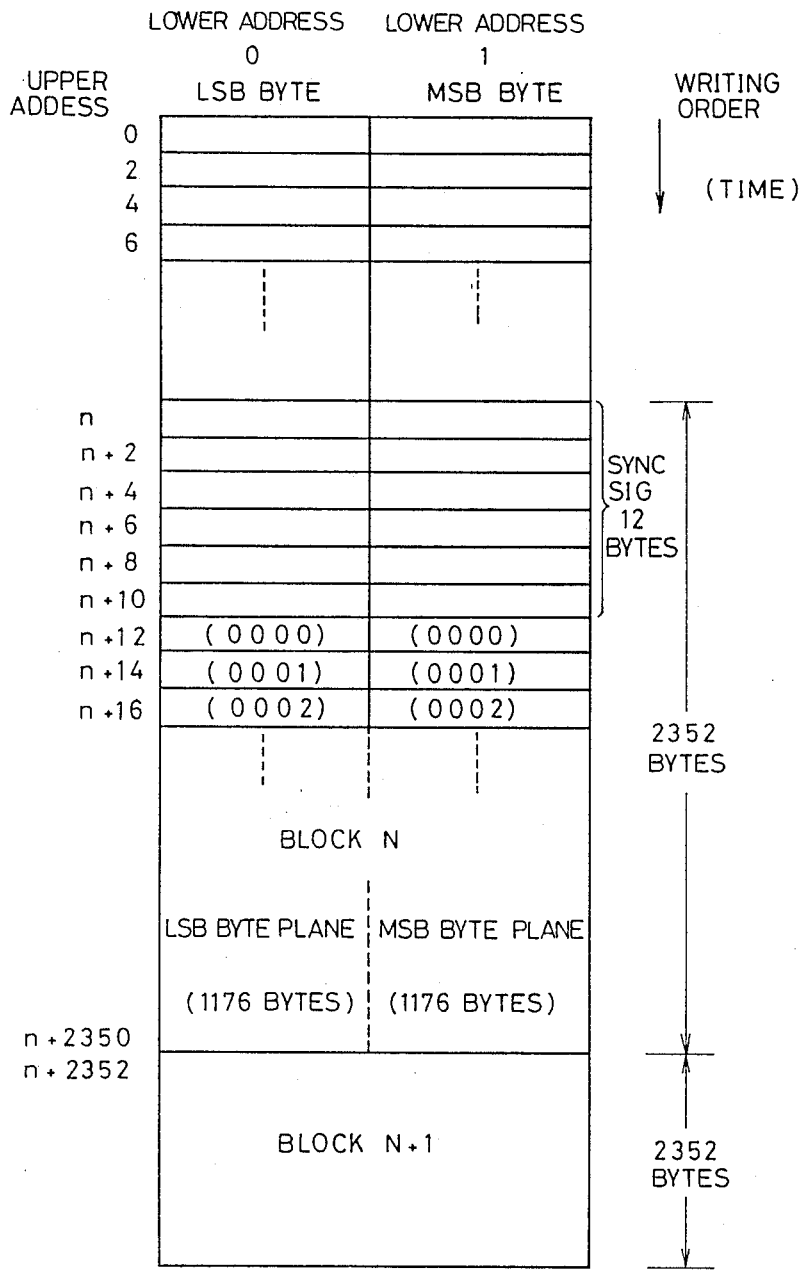

The RAM writing circuit 12 includes a writing address pointer (WRPT) 12a as shown in FIG. 1, and the data of one block is sequentially written into the buffer RAM 16 in accordance with the writing address "WRA" being produced by the pointer 12a. Such a situation is shown in FIG. 13. The data of one block is written into the buffer RAM 16 in the order that the data arrives, that is, in the sequence from an LSB byte to an MSB byte starting with the synchronous signal.

Now, it is assumed that an upper order address of a starting address of a N-th block is "n", in this case, the data of the N-th block (2352 bytes) is written in an area where the upper order address is "n" through "n+2350". The data written into the buffer RAM 16 is sectioned in the lower order bytes and the upper order bytes which respectively form the LSB byte plane and the MSB byte plane. In the buffer RAM 16 the upper order address of which is "n" through "n+10", the synchronous signal of 12 bytes is written, and the header, the user data, . . . , the P parity symbols, and Q parity symbols which constitute the P code and the Q code are sequentially written into the buffer RAM 16 having the upper order address of more than "n+12".

The following describes the configurations of the P code and the Q code. The P code and the Q code are respectively constructed with respect to the LSB byte plane and the MSB byte plane except for the synchronous signal. The respective byte planes include the P code which includes the data of 1032 bytes (2064/2) and the P parity symbols of 86 bytes (172/2) being added to the data, and the Q code which includes the data of 1032 bytes and the Q parity symbols of 52 bytes (104/2) being added to the data, the data being constructed by the header, the user data, the EDC and the space. Such a configuration is shown in FIG. 14.

The data of 1032 bytes forming the respective planes is arranged in a manner as shown in FIG. 14. More specifically, the data of 1032 bytes is arranged in 24 lines by 43 columns, and two P parity symbols are added to the respective columns, that is, 24 data, so that one P code word is formed. Accordingly, 86 P parity symbols are added to 43 columns in total. Thus, as shown in FIG. 14, one P code word is formed for each column. In FIG. 14, a numeral of four digits shows a symbolic location (L) in the plane, that is, the position in the arrangement of FIG. 14. The symbolic location (L) of the j-th symbol of the i-th P code word becomes as follows:

$$L = i + 43j \quad (1)$$

where, i=0, 1, ---,42, and j=0, 1, ---, 25. For example, the symbolic location (L) of the 23rd symbol of the 1st P code word is obtainable in accordance with the formula (1) as follows:

$$L = 1 + 43 \times 23 = 990$$

Figures 15, 17:
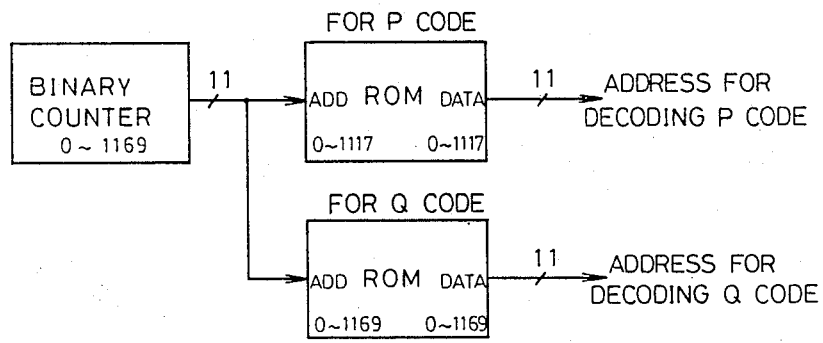

On the other hand, 42 data including the P parity symbol are obliquely gathered in FIG. 14, and the Q code word is constructed by the gathered 42 data and two Q parity symbols being added to the gathered data. Meanwhile, if it reaches the 25th column, it jumps to the first (0-th) column again. The state where the Q code word having such a configuration are re-arranged is shown in FIG. 15. In FIG. 15, four digit the numeral indicates the symbolic location (L) in the plane in the arrangement as shown in FIG. 14. Then, the symbolic location (L) of the j-th symbol of the i-th Q code word can be evaluated as follows:

$$L = (43i + 44j) \bmod 1118 \quad (2)$$

where, i=0, 1, ---, 25, and j=0, 1, ---, 42.

$$L = 1118 + i + 26(j - 43) \quad (3)$$

where, i=0, 1, ---,25, and j=43 and 44. Meanwhile, the above described formula (2) indicates the surplus of $(43i+44j)/1118$.

For example, the symbolic location (L) of the 2nd symbol of the 1st Q code word is obtainable in accordance with the formula (2) as follows:

$$L = (43 \times 1 + 44 \times 2) \bmod 1118 = 131$$

The symbolic location (L) of the 42nd symbol of the O-th Q code word is obtainable in accordance with the formula (2) as follows:

$$L = (43 \times 0 + 44 \times 42) \bmod 1118 = 730$$

The symbolic location (L) of the 44th symbol of the 25-th Q code word is obtainable in accordance with formula (3) as follows:

$$L = 1118 + 25 + 26(44 - 43) = 1169$$

A relationship between the respective symbolic locations (L) of the above described P or Q code word and the address A (see FIG. 3) in accordance of which the data is written into the buffer RAM 16 can be represented as follows:

$$A = H + 2L + p \qquad (4)$$

where, H is a starting address of the data of one block not including the synchronous signal ("n+12" in the example of FIG. 13), and p indicates the LSB byte plane as "0" and the MSB byte plane as "1".

For example, the data of the symbolic location L=0001 as shown in FIG. 14 is stored in the address A (see FIG. 13) in accordance with the formula (4), if p=0, as follows:

$$A = (n+12) + 2 \times 1 + 0 = n + 14$$

Then, when the P and Q codes having the above described configuration are decoded, the symbols constructing the respective codes are read from the buffer RAM 16 by addressing the buffer RAM 16 in accordance with the above described formula (4), and decoded. In the present invention, addressing corresponding to the respective codes can be performed by means of the logic circuit shown in FIG. 1.

Figure 16:
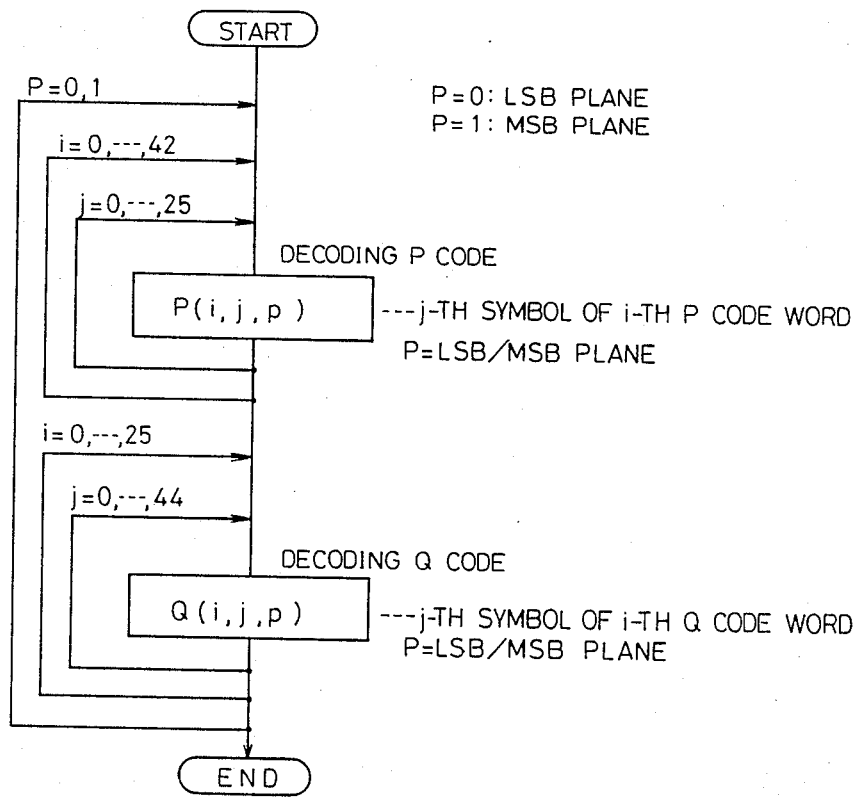

The process for error correcting with respect to the LSB byte plane and the MSB byte plane, that is, the process for decoding the P and Q codes is performed as shown in FIG. 16. In FIG. 16, the loops are executed in order from the inside to outside. In this example, the Q code is decoded after decoding of the P code, however such a process may be reversed. In addition, since the process for error correcting to the lower order (LSB) byte plane and the process for error correcting to the upper order (MSB) byte plane can be executed independently from each other, any one of the processes may be executed prior to the other one. The specific decoding method of the P code and the Q code is not the substance of the present invention. The substance of the present invention resides in the point that the buffer RAM 16 is addressed in the order shown in FIG. 16 so that the respective code words being written in the buffer RAM 16 can be sequentially read.

The following refers to FIG. 1 and describes the circuit 13 for generating such an address.

The previously described "H" which is the starting address of the block to be decoded not including the synchronous signal is outputted from a reading address pointer (RDPT) 20. The address "H" is obtainable from the writing address pointer 12a. More specifically, the address "H" of the block of one block before is read for each one block from the pointer 12a, and the block of one block before is decoded. In addition, the writing address "WRA" of the buffer RAM 16 or the reading address "RDA" for reading the buffer RAM 16 being outputted from the full adder (FA2) 21 is selectively outputted to the address bus in accordance with the timing signal.

The signal "p" being inputted to the full adder 21 is a LSB/MSB plane selecting signal, and the same will be "0" or "1". The signal "L" showing the symbolic location of the code word is also inputted to the full adder 21, whereby the aforementioned address signal "H+2L+p" (see the formula (4)) is outputted from the full adder 21.

The following describes the production of the signal "L" in decoding the respective code words. In the following, P(i, j, p) means the j-th symbol of the i-th P code word in the P plane. Q(i, j, p) is indicated in the same way.

(1) Decoding the P code

A code word counter (CWC) 22 counts and holds "i" out of the parameters of the P code P(i, j, p).

A constant generator (CONST GEN) 23 generates various constants in synchronism with various timing signals. Such a circuit may be implemented by a PLA (programmable logic array).

Figure 2:
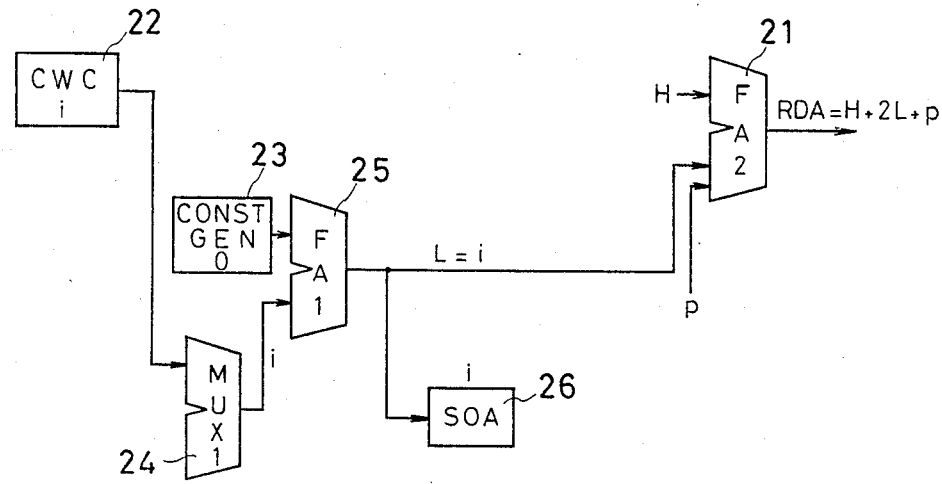

(1-1) The case of P(i, O, p) (see FIG. 2)

The constant generator (CONST GEN) 23 outputs "0", and "i" is outputted from the multiplexer (MUX1) 24, whereby "i" is outputted from the full adder (FA1) 25. Therefore, L=i is outputted from FA1 25 so that the address $RDA = H + 2L + p = H + 2i + p$ can be outputted from the full adder (FA2) 21. The signal "i" is latched in a symbol off-set address (SOA) 26 for generating the address thereafter.

Figure 3:
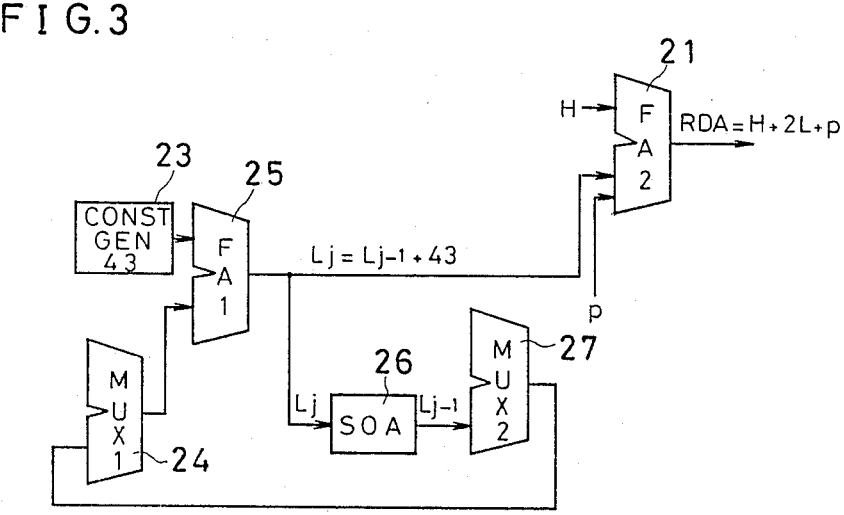

(1-2) In the case of P(i, j, p), j≠0 (see FIG. 3)

The operation of this case is executed continuously after operation of the case (1-1).

In order to generate the address for P(i, j, p), the value of "L" which is held in the SOA 26 in generating the symbol of one symbol before is utilized. On the assumption that "L" is "$L_j$" when P(i, j, p) and "L" is "$L_{j-1}$" when the symbol P(i, j−1, p) of one symbol before, the constant generator (CONST GEN) 23 applies the constant "43" to the FA1 25 in response to the in putted timing signal so that $L_j = L_{j-1} + 43$ is obtainable. By calculating the recurrence formula, $L_j = i + 43j$ is obtainable, and therefore the address "RDA" becomes $H + 2L + p = H + 2(i + 43j) + p$. In FIG. 3, "$L_{j-1}$" of one symbol before is returned to the multiplexer (MUX1) 1 via the multiplexer (MUX2) 27 from the SOA 26 and inputted to the FA1 25.

Figure 10:
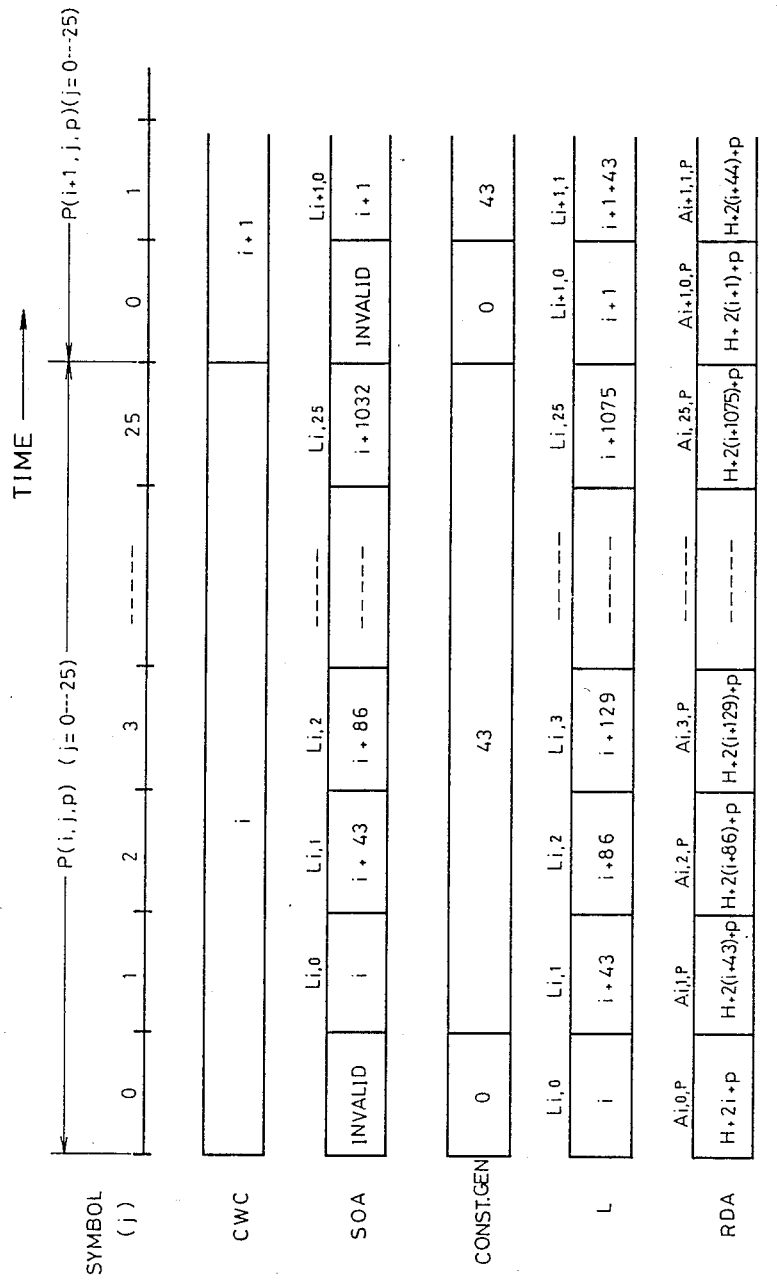

FIG. 10 is a view showing the timing for generating the address for the above described P code. For example, "L" of P(0, 25, 0) is $0 + 43 \times 25 = 1075$, and therefore "RDA" becomes $H + 2(i + 1075) + p = H + 2150$.

Thus, the address "RDA" is generated by the logical circuit as shown in FIG. 1 so that each of the i-th (i=0, 1, ---, 42) P code word is sequentially read from the buffer RAM 16 from the first symbol to the 25th symbol.

(2) Decoding the Q code

Figure 4:
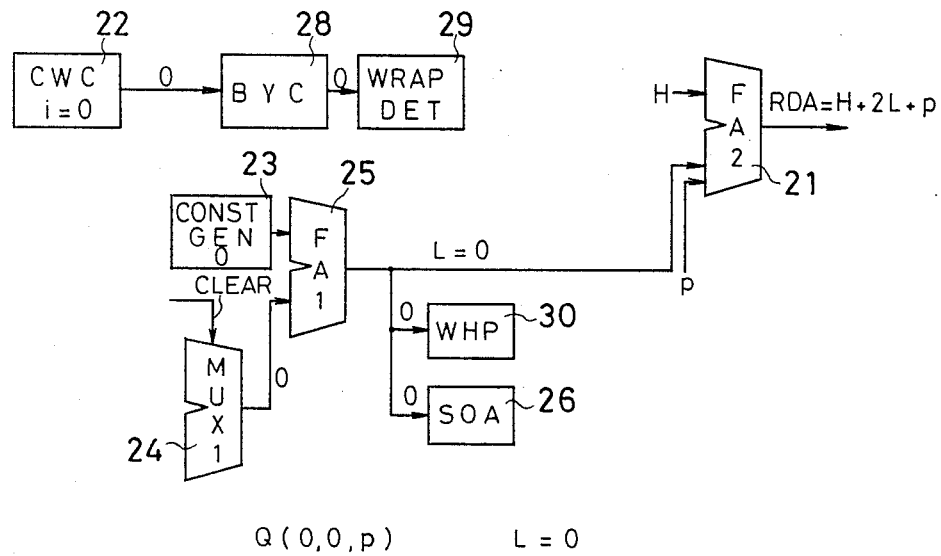

(2-1) In the case of Q(0, 0, p) (see FIG. 4)

The code word counter (CWC) 22 is "0" and the value is loaded in a symbol counter (BYC) 28. The symbol counter (BYC) 28 operates as a 26-nary counter in cooperation with "25" detector (WRAP DET) 29, and generates a wrap signal (WRAP). More specifically, as is understood from the producing method for the Q code word as shown in FIG. 14, the position of the 25-th symbol of the 0-th Q code word is in the bottom line in the arrangement shown in FIG. 14, and the 26-th symbol will be more to jump to the uppermost line in the same arrangement. The wrap signal is a signal indicating the timing for such a jump, and will be described later in detail.

The constant generator (CONST GEN) 23 and the multiplexer (MUX1) 24 output "0", so the output of the full adder (FA1) 25, that is, the symbolic location "L" becomes "0". Therefore, the address "RDA" becomes $H+2L+p=H+2\times 0+p=H+p$.

In addition, L=0 is taken into the symbol offset address (SOA) 26 and a word heading symbol pointer (WHP) 30. The value is utilized in the Q code Q(i, j, p)(i≠0, j≠0) thereafter.

Figure 5:
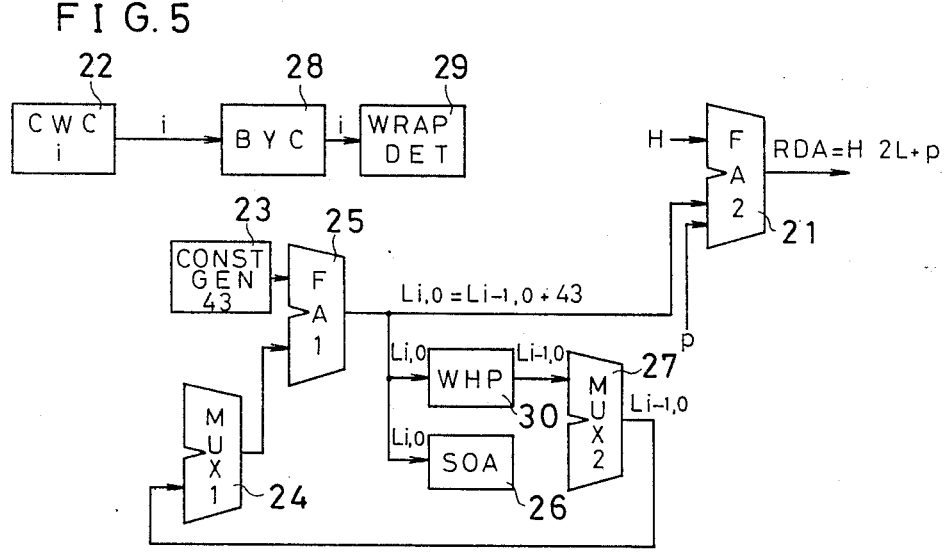

(2-2) In the case of Q(i, 0, p)(i≠0) (see FIG. 5)

The address for the first symbol of the Q symbol in which i is not "0" is different from that of the Q code word Q(0, 0, p) in which i is "0", and is generated in the following manner.

The code word counter (CWC) 22 counts "i", and the value "i" is loaded into the symbol counter (BYC) 28. The constant generator (CONST GEN) 23 generates "43", and the symbolic location "$L_{i,\,0}$" generated by utilizing the symbolic location "$L_{i-1,\,0}$" of one symbol before. More specifically, the symbolic location "$L_{i-1,\,0}$" is generated in generating the address for the 0-th symbol Q(i−1, 0,p) of one symbol before, and the symbolic location "$L_{i-1,\,0}$" is held in the word heading symbol pointer (WHP) 30. The value "$L_{i-1,\,0}$" is inputted to the full adder (FA1) 25 through the multiplexers (MUX2 and MUX1) 27 and 24. Therefore, $L_{i,\,0}=L_{i-1,\,0}+43$ is outputted from the full adder (FA1) 25. As shown in the case of (2-1), since $L_{0,\,0}=0$, $L_{i,\,0}=43i$ is obtainable by calculating the recurrence formula. Therefore, the address "RDA" which is outputted from the full adder (FA2) 21 becomes $RDA=H+2L+p=H+2\times 43i+p=H+86i+p$.

The value of the newly calculated $L_{i,\,0}$ is held the word heading symbol pointer (WHP) 30 and utilized in evaluating "$L_{i+1,\,0}$" of the next code word Q (i+1, 0, p).

As shown in the 0-th column (the leftmost column) of FIG. 15, the symbolic location "$L_{i,\,0}$" of the 0-th symbol of Q(i, 0, p) becomes 43i.

Figure 6:
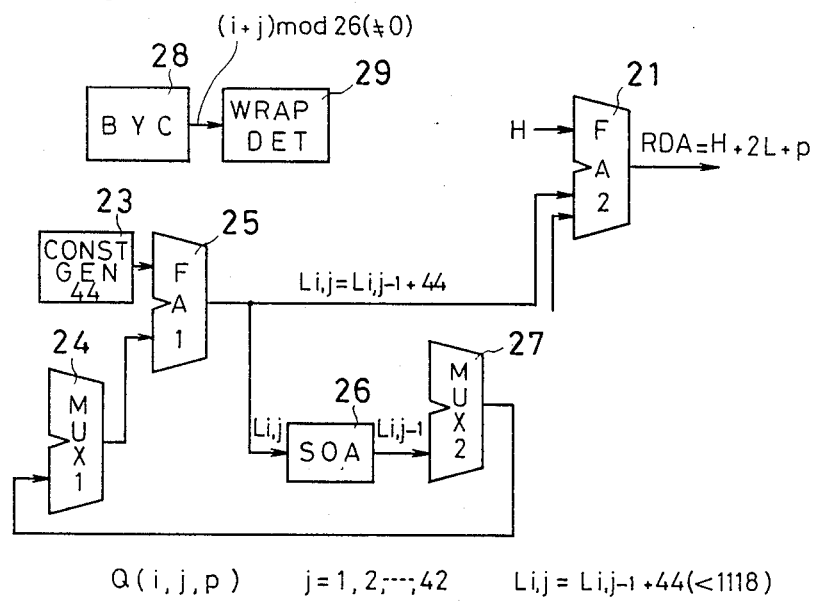

(2-3) In the case of Q(i, j, p)(i≠0, j≠0, J≦42) but except for the next symbol when the BYC counts "25" (see FIG. 6)

The operation of this case will be executed continuously after the above described operation of the case (2-1) or the case (2-2). The symbol counter (BYC) 28 is incremented one by one from the initial value which is the value i set for Q(i, 0, p) in accordance with that j is increased one by one, and the value thereof becomes "i+j" for the j-th symbol, that is, Q(i, j, p). If the value "i+j" exceeds "25", that is, when the uppermost line is designated after reaching the lowermost line in FIG. 14, the value of the BYC 28 is "0" for Q(i, j+1, p) since the BYC 28 is formed as the 26-nary counter. This will be described in the next paragraph (2-4). Therefore, the value of the BYC 28 becomes (i+j)mod 26 (≠0).

In this operation mode, the constant generator (CONST GEN) 23 generates "44", and the symbolic location "$L_{i,\,j}$" is generated by utilizing the symbolic location "$L_{i,\,j-1}$" of one symbol before. More specifically, the symbolic location $L_{i,\,j-1}$ is generated in generating the address for the symbol Q(i, j−1, p) of one symbol before, and held in the symbol offset address (SOA) 26. The value is inputted to the full adder (FA1) 25 through the multiplexer (MUX2 and MUX1) 27 and 24. Therefore, $L_{i,\,j}=L_{i,\,j-1}+44$ is outputted from the FA1 25. As apparent from the description for the case (2-2), $L_{i,\,0}=43i$, and therefore, $L_{i,\,j}=43i+44j$ is obtainable. However, due to the symbol jump described later in the case of (2-4), the symbolic location is obtainable as $L_{i,\,j}=(43i+44j)\,mod\,1118$.

Accordingly, the address "RDA" to be calculated becomes $RDA=H+2L+p=H+2[(43i+44j)mod\,1118]+p$.

For example, the symbolic location L0, 2 of the 2nd symbol of the 0-th Q code word is obtainable as follows:

$$L_{0,\,2}=(43\times 0+44\times 2)=88$$

and, the symbolic location $L_{1,\,1}$ of the first symbol of the 1st Q code word is obtainable as follows:

$$L_{1,\,1}=(43\times 1+44\times 1)=87\text{ (see FIG. 14)}$$

Figure 7:
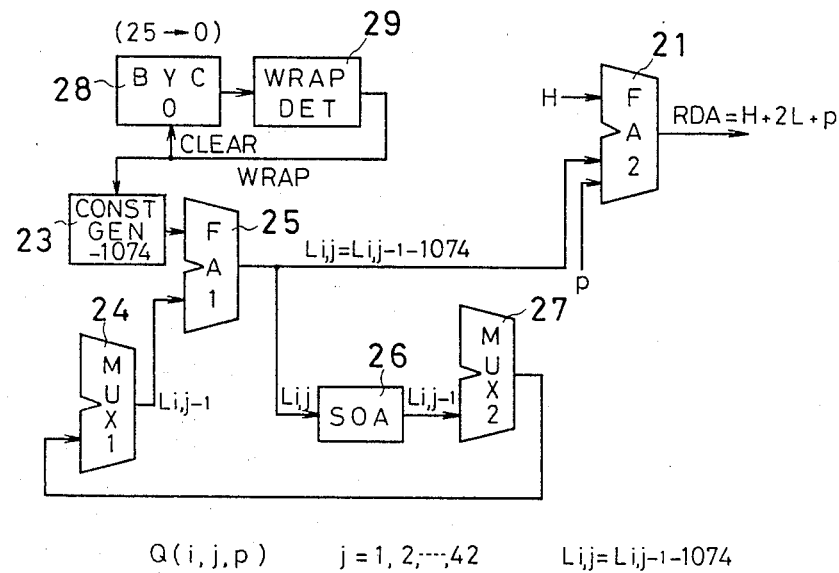

(2-4) In the case of Q(i, j, p)(i≠0, j≠0, j≦42, and the next symbol after the BYC counts 25 (see FIG. 7).

The operation for the next symbol Q(i, j, p) when the BYC 28 counts "25" is different from that of the aforementioned case (2-3) and in this case, the address is generated in the following manner. When the BYC 28 counts "25", the wrap signal (WRAP) is generated by the "25" detector 29, and the BYC 28 becomes "0" at the timing of the next symbol rather than "26" (synchronous clear). Where the wrap signal (WRAP) is generated, in order to the symbolic location of the Q code word, "1074" should be subtracted from the symbolic location of one symbol before rather than that "44" is added to the symbolic location of one symbol before as described in the previous case (2-3). For example, in FIG. 14, the 0-th Q code word starts at the symbolic location (0000) of 0-th line and the 0-th column and goes to (0044), (0088), --- so as to go down for each one line, and reaches the lowermost line, that is, the 25-th line at the 25-th symbol (BYC=25), and thereafter returns to the 0-th line at the next 26-th symbol, whereby the symbolic location L is obtainable as $L=43\times 0+44\times (26-1)-1074=0026$ at that time, in the next, becomes the symbolic location of (0070=0026+44) of the 1st line and the 27-th column, further goes down again one by one for each line, whereby the symbolic location will be changed as (0114=0070+44), ---. Thus, in FIG. 14, when the symbol jumps from the 25-th line to the 0-th line, the above described wrap signal is generated. In this time, the constant generator (CONST GEN) 23 generates "−1074" rather than "44". Accordingly, the symbolic location $L_{i,\,j}$ becomes $L_{i,\,j}=L_{i,\,j-1}-1074$. Since −1074=44−1118, resultingly, the symbolic location $L_{i,\,j}=43i+44(j-1)-1074=43i+44j-1118=(43i+44j)mod\,1118$.

Therefore, the address "RDA" which is outputted from the full adder (FA2) 21 becomes $RDA = H + 2L + p = H + 2[(43i + 44j) \mod 1118] + p$.

Figure 8:
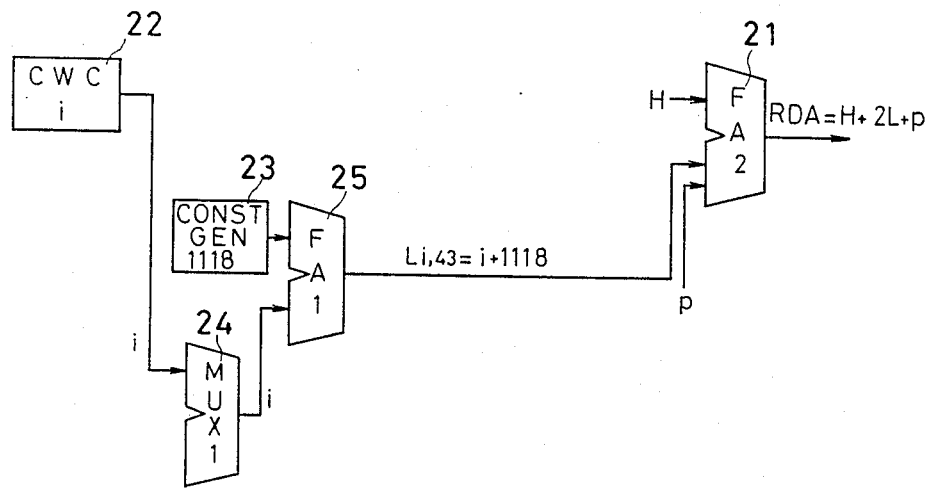

(2-5) In the case of Q(i, 43, p) (see FIG. 8)

As is easily understood from FIG. 14 or FIG. 15, the symbolic location in this case becomes $L_{i, 43} = i + 1118$. The logical circuit of this case is shown in FIG. 8.

Figure 9:
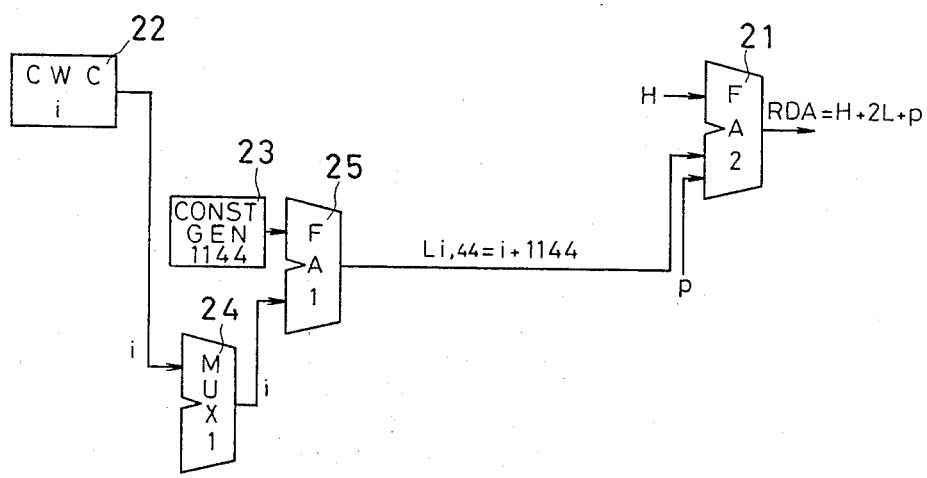

(2-6) In the case of Q(i, 44, p) (see FIG. 9)

As is easily understood from FIG. 14 or FIG. 15, the symbolic location in this case becomes $L_{i, 44} = i + 1144$. The logical circuit of this case is shown in FIG. 9.

Figure 11:
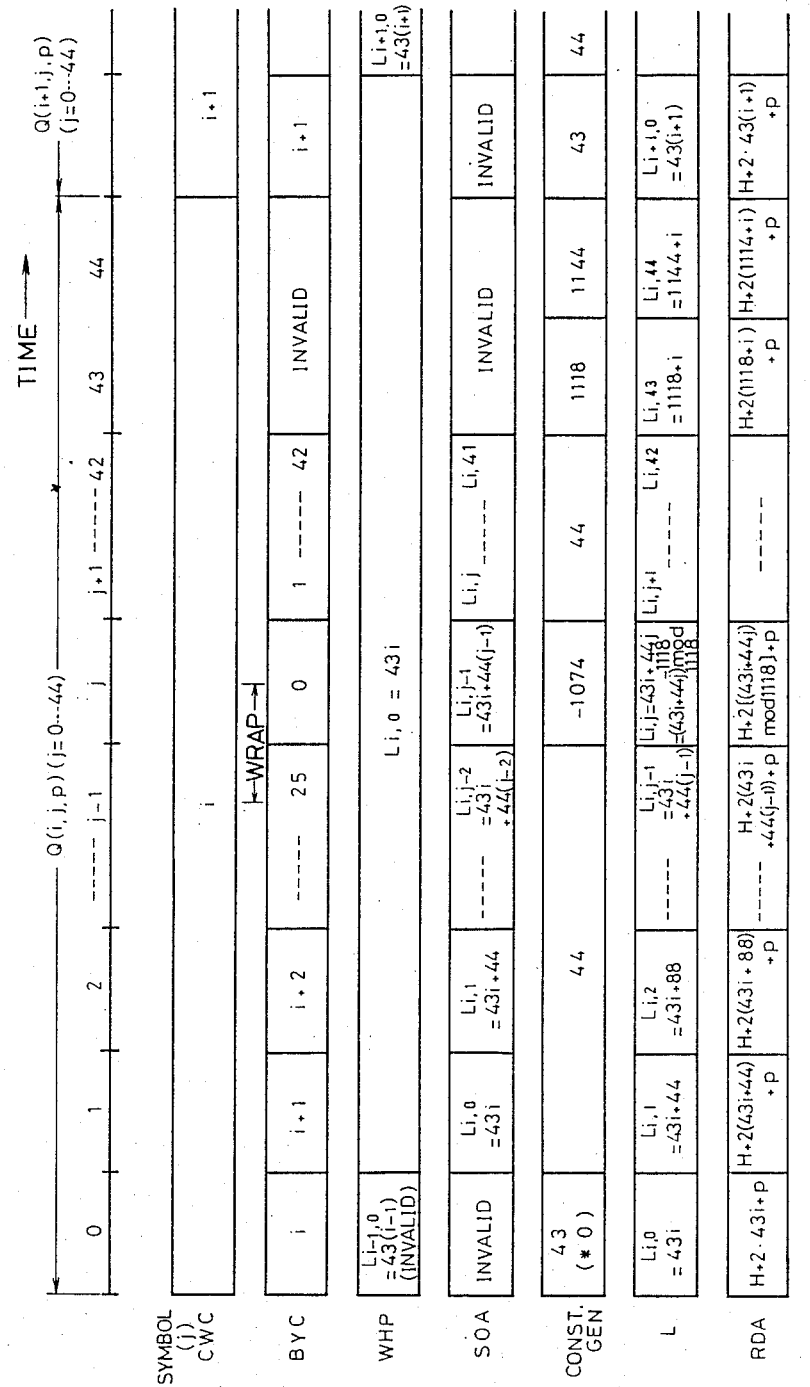

The timing when the address for the above described Q code word is generated is shown in FIG. 11.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An address generating circuit which generates reading addresses for addressing a memory in which a plurality of error correcting code words composed of data and parity symbols for detecting or correcting errors in the data are sequentially stored for each symbol so that said data and parity symbols are sequentially read from said memory for each symbol in an order corresponding to a decoding order number so as to decode said error correcting code words, said error correcting code words being formed by data arranged for each symbol in a predetermined arrangement and parity symbols which are added to the data based on said predetermined arrangement, comprising:

a first operation circuit for generating a symbolic location of each symbol in said predetermined arrangement based on at least the order number of the symbol of said error correcting code words; and a second operation circuit for generating an address of each symbol with respect to said memory based on at least said symbolic location being outputted from said first operation circuit.

2. An address generating circuit in accordance with claim 1, wherein said first operation circuit generates the symbolic location of the each symbol in said predetermined arrangement on the basis of the order number of the error correcting code words as well as the order number of the symbol of the error correcting code word.

3. An address generating circuit in accordance with claim 2, wherein said first operation circuit includes a feed-back loop responsive to the symbolic location being outputted for generating a symbolic location of a subsequent symbol.

4. An address generating circuit in accordance with claim 3, wherein said first operation circuit includes a constant generation circuit for generating a constant based on said predetermined arrangement.

* * * * *